United States Patent
Miyake et al.

(10) Patent No.: US 8,399,568 B2
(45) Date of Patent: Mar. 19, 2013

(54) RESIN COMPOSITION AND MOLDED ARTICLE USING THE SAME

(75) Inventors: Yuichi Miyake, Nagoya (JP); Takuya Nishimura, Okazaki (JP); Satoru Moritomi, Chiba (JP); Mitsuyoshi Shimano, Kimitsu (JP)

(73) Assignees: Toyota Jidosha Kabushiki Kaisha, Aichi-ken (JP); Sumitomo Chemical Company, Limited, Tokyo (JP)

( * ) Notice: Subject to any disclaimer, the term of this patent is extended or adjusted under 35 U.S.C. 154(b) by 294 days.

(21) Appl. No.: 12/808,972

(22) PCT Filed: Dec. 15, 2008

(86) PCT No.: PCT/JP2008/072764
§ 371 (c)(1),
(2), (4) Date: Jun. 17, 2010

(87) PCT Pub. No.: WO2009/078376
PCT Pub. Date: Jun. 25, 2009

(65) Prior Publication Data
US 2010/0273959 A1    Oct. 28, 2010

(30) Foreign Application Priority Data

Dec. 17, 2007   (JP) .................................. 2007-324612

(51) Int. Cl.
*C08F 4/44* (2006.01)
(52) U.S. Cl. ...................................... 525/240; 526/348.6
(58) Field of Classification Search .................. 525/240; 526/348.6
See application file for complete search history.

(56) References Cited

FOREIGN PATENT DOCUMENTS

| | | |
|---|---|---|
| JP | 06-263892 A | 9/1994 |
| JP | 2003-313434 A | 11/2003 |
| JP | 2006-052248 A | 2/2006 |
| JP | 2006-077063 A | 3/2006 |
| JP | 2007-277444 | * 10/2007 |
| JP | 2007-277444 A | 10/2007 |
| JP | 2008-038142 A | 2/2008 |

* cited by examiner

*Primary Examiner* — Robert D. Harlan
(74) *Attorney, Agent, or Firm* — Sughrue Mion, PLLC

(57) ABSTRACT

This invention provides a resin composition comprising a polyolefin-based polymer and an aliphatic polyester-based polymer, which has an excellent balance of impact resistance and rigidity and excellent properties, such as processability. The resin composition comprises a polyolefin-based polymer (A), an aliphatic polyester-based polymer (B), an elastomer (C), which has a melt flow rate (MFR), measured at 190° C. under a load of 21N, of 0.5 to 3.0 g/10 minutes, and an epoxy group-containing polyolefin-based polymer (D).

6 Claims, No Drawings

RESIN COMPOSITION AND MOLDED ARTICLE USING THE SAME

TECHNICAL FIELD

The present invention relates to a resin composition comprising an aliphatic polyester-based polymer, such as polylactic acid, and a polyolefin-based polymer and a molded article using the same.

BACKGROUND ART

A polymer alloy technology of producing a polymer composition having properties of interest by blending a plurality of types of polymers is known. For example, an attempt to obtain biodegradable molding materials by mixing so-called biodegradable plastics with polyolefin-based polymers, which are known as general-purpose polymers, has been proposed. On the basis of this perspective, JP Patent Publication (kokai) No. 2006-77063 A discloses a technology of mixing acid- or epoxy group-containing polyolefin with a polymer alloy of a polyolefin-based polymer and a biodegradable plastic to improve the dispersion conditions of the polyolefin-based polymer and the biodegradable plastic.

Also, JP Patent Publication (kokai) No. 2006-52248 A discloses a polymer alloy comprising a polylactic acid resin, an epoxy group-containing polyolefin resin, and an epoxy resin. JP Patent Publication (kokai) No. 2006-52248 A discloses that such a composition results in a polylactic acid-based resin composition with improved impact resistance, hydrolysis resistance, and thermal stability.

According to the technology disclosed in JP Patent Publication (kokai) No. 2006-77063 A, the impact resistance of a molded article using a polymer alloy containing a polyolefin-based polymer can be improved. However, various other properties, such as tensile elongation property at break and flexural modulus in particular, could not be significantly improved.

According to the technology disclosed in JP Patent Publication (kokai) No. 2006-52248 A, properties of a biodegradable polylactic acid resin can be improved, but this technology would not improve properties of a polyolefin-based polymer, which is a general-purpose polymer.

DISCLOSURE OF THE INVENTION

Problem to Be Resolved by the Invention

Under the above circumstances, the present invention is intended to provide a resin composition comprising a polyolefin-based polymer and an aliphatic polyester-based polymer, which has an excellent balance of impact resistance and rigidity and excellent properties, such as processability, and a molded article using the same.

Means for Resolving the Problem

The present inventors have conducted concentrated studies in order to attain the above objects. As a result, they discovered that mixing of a composition comprising a polyolefin-based polymer and an aliphatic polyester-based polymer with an elastomer with specific properties would lead to the production of a resin composition which has an excellent balance of impact resistance and rigidity and excellent properties, such as processability. This has led to the completion of the present invention.

Specifically, the present invention includes the following.

(1) A resin composition comprising a polyolefin-based polymer (A), an aliphatic polyester-based polymer (B), an elastomer (C) having a melt flow rate (MFR), measured at 190° C. under a load of 21N, of 0.5 to 3.0 g/10 minutes, and an epoxy group-containing polyolefin-based polymer (D).

When the total amount of the polyolefin-based polymer (A), the aliphatic polyester-based polymer (B), the elastomer (C), and the polyolefin-based polymer (D) is designated as 100% by weight in the resin composition according to the present invention, it is preferable that the content of (A) be 30 to 90% by weight, the content of (B) be 1 to 50% by weight, the content of (C) be 1 to 40% by weight, and the content of (D) be 0.01 to 20% by weight. Moreover, it is preferable that the elastomer (C) have a density of 0.855 to 0.875 g/cm$^3$. The polyolefin-based polymer (A) may be a crystalline polypropylene-based polymer, and the polyolefin-based polymer (D) may be a polyethylene-based polymer.

Moreover, the use of the resin composition according to the present invention enables a variety of molded articles to be produced.

This description includes part or all of the contents as disclosed in the description and/or drawings of Japanese Patent Application No. 2007-324612, on which the priority claim of the present application is based.

BEST MODES FOR CARRYING OUT THE INVENTION

Hereafter, the present invention is described in greater detail.

The resin composition according to the present invention comprises a polyolefin-based polymer (A), an aliphatic polyester-based polymer (B), an elastomer (C) having a melt flow rate (MFR), measured at 190° C., of 0.5 to 3.0, and an epoxy group-containing polyolefin-based polymer (D). Hereafter, such components are described in detail.

Polyolefin-Based Polymer (A)

The term "polyolefin-based polymer (A)" refers to a polymer comprising polyolefin as a main component. A polymer having, at least in part, a crystalline region is preferably used as the polyolefin-based polymer (A). Specifically, use of a crystalline polyolefin-based polymer as the polyolefin-based polymer (A) is preferable. A non-crystalline polymer may be used as the polyolefin-based polymer (A). When a crystalline polymer is used as the polyolefin-based polymer (A), the degree of crystallinity determined by X-ray diffraction analysis is preferably 25% or higher, more preferably 35% or higher, and even more preferably 40% or higher. Examples of polyolefins that can be used herein include butene-based polymers, methylpentene-based polymers, polyethylene-based polymers, and polypropylene-based polymers. The polyolefin-based polymer (A) may be a mixture of two or more of such polyolefins.

The polyethylene-based polymers are not particularly limited. Examples thereof include polyethylene resins, such as low density polyethylene, high density polyethylene, linear low density polyethylene, and ultra high molecular weight polyethylene, and copolymers of ethylenes and polar monomers, such as ethylene-vinyl acetate copolymers, ethylene-methyl acrylate copolymers, ethylene-ethyl acrylate copolymers, ethylene-methyl methacrylate copolymers, ethylene-dimethylaminomethyl methacrylate copolymers, ethylene-vinyl alcohol copolymers, and ethylene oxide adducts of ethylene-vinyl alcohol copolymers.

The polypropylene-based polymers are not particularly limited. Examples thereof include polypropylenes, such as homoisotactic polypropylene, isotactic polypropylene random copolymers containing ethylene or 1-butene, isotactic polypropylene block copolymers containing ethylene propylene, Ziegler-Natta catalyst catalyzed isotactic polypropylene, metallocene catalyzed isotactic polypropylene, metallocene catalyzed syndiotactic polypropylene, and atactic polypropylene; and functionalized polypropylenes, such as a polymer alloy of polypropylene and rubber, a polypropylene/filler composite, and chlorinated polypropylene.

The melt flow rate (MFR) of the polyolefin-based polymer (A) measured at 230° C. under a load of 21N is not particularly limited, and it is preferably 1 to 100 g/10 minutes, more preferably 10 to 80 g/10 minutes, and most preferably 30 to 60 g/10 minutes. Further, the flexural modulus of the polyolefin-based polymer (A) at 23° C. is not particularly limited, and it is preferably 500 to 2,000 Mpa.

Aliphatic Polyester-Based Polymer (B)

Examples of the aliphatic polyester-based polymer (B) include aliphatic polyesters prepared by ring-opening polyaddition of polylactic acid, polyglycolic acid, poly(3-hydroxybutyric acid), poly(4-hydroxybutyric acid), poly(4-hydroxyvaleric acid), and polycaprolactone and aliphatic polyesters prepared by polycondensation of polyester carbonate, polyethylene succinate, polybutyrene succinate, polyhexamethylene succinate, polyethylene adipate, polybutyrene adipate, polyhexamethylene adipate, polyethylene oxalate, polybutyrene oxalate, polyhexamethylene oxalate, polyethylene sebacate, and polybutyrene sebacate. Among them, poly(α-hydroxy acid), such as polylactic acid or polyglycolic acid, is preferable as the aliphatic polyester-based polymer (B), and polylactic acid is particularly preferable. General polylactic acid is a highly biodegradable crystalline polymer, which is represented by general formula: H—[O—CH(CH$_3$)—C(O)]$_n$—OH and which has a melting point of about 160° C. to 170° C. and a glass transition point of about 58° C.

As the aliphatic polyester-based polymer (B), one of the aforementioned types of aliphatic polyesters may be used alone, or a blend or copolymer of two or more types of such polyesters may be used. Examples of aliphatic polyester copolymers include copolymers of lactic acid and a hydroxy acid other than lactic acid and polybutyrene succinate adipate. As aliphatic polyester blends, for example, polylactic acid-based resin containing polylactic acid as a base is preferable. Examples of other resins to be blended with polylactic acid include: the aforementioned aliphatic polyesters other than polylactic acid; aromatic polyesters, such as polyethylene terephthalate and polybutyrene terephthalate; polyamides, such as Nylon 6, Nylon 6,6, Nylon 6,9, Nylon 6,10, Nylon 6,12, Nylon 11, and Nylon 12; and natural rubber. In such polylactic acid-based resin, the proportion of resins other than polylactic acid is preferably 40% by weight or lower, and more preferably 30% by weight or lower.

When polylactic acid is used as the aliphatic polyester-based polymer (B), a method for synthesizing polylactic acid is not particularly limited. Polylactic acid may be synthesized by direct polymerization of D-lactic acid or L-lactic acid or by ring-opening polymerization of a cyclic dimer of lactic acid, such as D-lactide, L-lactide, or meso-lactide. Polylactic acid may be composed of either L-lactic acid-derived monomer units or D-lactic acid-derived monomer units, or it may be a copolymer having both types of monomer units. Further, a blend comprising arbitrary proportions of a plurality of polylactic acids differing with respect to the propotions of the L-lactic acid-derived monomer units and the D-lactic acid-derived monomer units may be used as the aliphatic polyester-based polymer (B).

Further, a copolymer prepared by further polymerizing other polymerizable monomer components, such as glycolide or caprolactone, in addition to the above lactic acid or lactide components may be used as polylactic acid. A product obtained by blending a polymer resulting from homopolymerization of such other polymerizable monomers may be blended with polylactic acid may be used as the aliphatic polyester-based polymer (B).

The MFR of the aliphatic polyester-based polymer (B) measured at 190° C. under a load of 21N is not particularly limited, and it is preferably 0.5 to 50 g/10 minutes, more preferably 1 to 30 g/10 minutes, and most preferably 10 to 20 g/10 minutes.

Elastomer (C)

The term "elastomer (C)" used herein refers to a rubber-like elastic material. The elastomer (C) comprises a rubber having crosslinked points within molecules and a thermoplastic elastomer in which molecules are restrained by a group of molecules in a hard layer within molecules. In particular, the elastomer (C) is restricted to have a property such that the MFR measured at 190° C. under a load of 21 N is 0.5 to 3.0 g/10 min. The MFR means a value measured in accordance with JIS K 7210, "the method for testing the flow of thermoplastic plastic."

The elastomer (C) is not particularly limited. Examples thereof include: aliphatic polyester elastomers, such as polybutyrene succinate carbonate; polyolefin-based elastomers, such as ethylene-propylene copolymers, ethylene-propylene-unconjugated diene copolymers, ethylene-butene-1 copolymers, ethylene-hexene-1 copolymers, and ethylene-octene-1 copolymers; acrylic elastomers, such as various acrylic rubbers, ethylene-acrylic acid copolymers and alkaline metal salts thereof (so-called ionomers), and ethylene-alkyl acrylate copolymers (e.g., ethylene-butyl acrylate copolymers); various elastmers, such as acid-modified ethylene-propylene copolymers, diene rubbers (e.g., polybutadiene, polyisoprene, and polychloroprene), copolymers of a diene and a vinyl monomer (e.g., styrene-butadiene random copolymers, styrene-butadiene block copolymers, styrene-butadiene-styrene block copolymers, styrene-isoprene random copolymers, styrene-isoprene block copolymers, styrene-isoprene-styrene block copolymers, materials obtained by graft-copolymerizing styrene to polybutadiene, and butadiene-acrylonitrile copolymer), polyisobutylene, copolymers of isobutylene, and butadiene or isoprene, and various elastomers of natural rubber, thiocol rubber, polysulfide rubber, acrylic rubber, silicone rubber, polyurethane rubber, polyether rubber, and epichlorohydrin rubber.

The MFR of the elastomer (C) measured at 190° C. under a load of 21N can be adjusted to between 0.5 and 3.0 g/10 minutes by adequately regulating the degree of polymerization when polymerizing the elastomer (C).

An elastomer having the density of 0.855 to 0.875 g/cm$^3$ is preferably used as the elastomer (C). The density means a value measured in accordance with JIS K 7112, "the method for measuring plastic density and specific gravity." The density can be adjusted to between 0.855 and 0.875 g/cm$^3$, by adequately regulation proportions of monomers to be used for producing the elastomer (C). In the case of an ethylene-butene-1 copolymer, for example, the polymerization ratio (ethylene/butene-1) of ethylene and butene-1, which are starting materials, may be adjusted to a range of 78/22 to 85/15.

Epoxy Group-Containing Polyolefin-Based Polymer (D)

The term "epoxy group-containing polyolefin-based polymer (D)" refers to a polymer prepared by grafting an epoxy group-containing ethylene monomer to polyolefin or a polyolefin copolymer of an epoxy group-containing ethylene monomer, ethylene, or α-olefin. Specifically, such polyolefin-based polymer (D) is obtained by a graft or copolymerization reaction.

A graft reaction is carried out by graft polymerizing an epoxy group-containing ethylene monomer to a polyolefin skeleton. Examples of methods of graft reactions include a method in which polyolefin, an epoxy group-containing ethylene monomer, and a radical initiator are mixed with heating in a solvent, such as an aromatic hydrocarbon compound (e.g., xylene or toluene) or an aliphatic hydrocarbon compound (e.g., hexane or heptane), a method of performing graft polymerization in a suspension state, and a method in which polyolefin, an epoxy group-containing ethylene monomer, and a radical initiator are mixed in advance under conditions in which the radical initiator would not be substantially decomposed, and the resultant is subjected to melt-mixing using a kneading machine that is commonly used in the synthetic resin field, such as an extruder, a Banbury mixer, or a kneader.

In the case of a method involving melt-mixing, conditions for grafting are adequately selected by taking into consideration the deterioration of the polyolefin, the degradation of the epoxy group-containing ethylene monomers, the decomposition temperature of the radical initiator, and the like. In general, graft polymerization is carried out at 80° C. to 350° C., and it is preferably carried out at 100° C. to 300° C.

Specific examples of epoxy group-containing ethylene monomers to be used for the graft reaction include glycidyl acrylate, glycidyl methacrylate, allyl glycidyl ether, and methacryl glycidyl ether.

A radical initiator to be used for the graft reaction generally has a one-minute half-life temperature of 80° C. or higher. Typical examples of radical initiators used for the graft reaction by melt-mixing include organic peroxides, such as dicumyl peroxide, benzoyl peroxide, di-tert-butyl peroxide, and 2,5-dimethyl-2,5-di(tert-butyl-peroxy)hexane. Examples of radical initiators used for the suspension graft reaction include organic peroxides, such as benzoyl peroxide, lauroyl peroxide, t-butyl peroxypivalate, t-butyl hydroperoxide, and dicumyl peroxide, and azo compounds, such as azobisisobutyronitrile and azobisdimethylvaleronitrile.

In the graft reaction, the proportions of an epoxy group-containing ethylene monomer and a radical initiator to be used relative to 100 parts by weight of polyolefin are generally as follows. In general, 0.1 to 20 parts by weight of the epoxy group-containing ethylene monomer is used. At 0.1 parts by weight or lower, the effects of polyester modification may be insufficient. When the proportion exceeds 20 parts by weight, some epoxy group-containing ethylene monomers may form their homopolymer without participating a graft reaction during the graft polymerization. In general, 0.001 to 5 parts by weight of the radical initiator is used. When the proportion of the radical initiator used is less than 0.001 parts by weight, the graft reaction may not proceed sufficiently. When the proportion exceeds 5 parts by weight, however, the occurrence of degradation and crosslinking may become apparent.

A copolymerization reaction is preferably carried out using equipment for producing high pressure low density polyethylene. The epoxy group-containing ethylene monomer to be used for the copolymerization reaction is the same compound as that is used in the graft reaction. In general, the percentage thereof to be copolymerized is preferably 0.2% to 20% by mole, and particularly preferably 0.5% to 15% by mole. Further, other comonomers can be copolymerized with a polyolefin copolymer of an epoxy group-containing ethylene monomer with ethylene or α-olefin. Examples of such comonomers include unsaturated carboxylic ester and vinyl ester.

Examples of the unsaturated carboxylic esters include alkyl (meth)acrylates and alkoxyalkyl (meth)acrylates. Alkyl (meth)acrylates generally have 3 to 30 carbon atoms and particularly preferably have 4 to 20 carbon atoms. Alkoxyalkyl (meth)acrylates generally have 4 to 35 carbon atoms and particularly preferably have 4 to 20 carbon atoms.

Vinyl esters generally have 20 carbon atoms at most, and preferably have 4 to 16 carbon atoms. Examples thereof include vinyl acetate, vinyl propionate, and vinyl butyrate, and vinyl acetate is particularly preferable.

The MFR of the epoxy group-containing polyolefin-based polymer (D) measured at 190° C. under a load of 21N is not particularly limited. It is preferably 0.1 to 30 g/10 minutes, more preferably 1 to 15 g/10 minutes, and most preferably 1 to 10 g/10 minutes.

As described above, the resin composition according to the present invention comprises a polyolefin-based polymer (A), an aliphatic polyester-based polymer (B), an elastomer (C), and an epoxy group-containing polyolefin-based polymer (D). The resin composition according to the present invention exhibits a structure in which the aliphatic polyester-based polymer (B) has been micro-dispersed by mixing the elastomer (C) when mixing the polyolefin-based polymer (A) with the aliphatic polyester-based polymer (B) in the presence of the epoxy group-containing polyolefin-based polymer (D). Thus, the resin composition according to the present invention comes to have an excellent balance of rigidity and impact resistance.

When the total amount of the polyolefin-based polymer (A), the aliphatic polyester-based polymer (B), the elastomer (C), and the polyolefin-based polymer (D) is designated as 100% by weight, it is particularly preferable that such components be blended with the content of (A) being 30% to 90% by weight, the content of (B) being 1% to 50% by weight, the content of (C) being 1% to 40% by weight, and the content of (D) being 0.01% to 20% by weight.

When the content of component (A) is less than 30% by weight, such problems as decrease in flexural modulus and lowering of thermal deflection temperature may arise. When the content of component (A) exceeds 90% by weight, such a problem as decrease in impact resistance may arise. Accordingly, the content of component (A) in the resin composition according to the present invention is preferably 30% to 90% by weight.

When the content of component (B) is less than 1% by weight, such a problem decrease in biodegradability may arise. When the content of component (B) exceeds 50% by weight, such problems as reduction in hydrolysis resistance and decrease in molding processability may arise. Accordingly, the content of component (B) in the resin composition according to the present invention is preferably 1% to 50% by weight.

When the content of component (C) is less than 1% by weight, such a problem as reduction in impact resistance may arise. When the content of component (C) exceeds 40% by weight, such problems as decrease in flexural modulus and lowering thermal deflection temperature may arise. Accordingly, the content of component (C) in the resin composition according to the present invention is preferably 1% to 40% by weight.

When the content of component (D) is less than 0.01% by weight, such problems as layer separation occurring at the time of molding and reduction in impact resistance may arise. When the content of component (D) exceeds 20% by weight, such problems as decrease in the flexural modulus may be decreased, and thermal denaturation temperature may be lowered. Accordingly, the content of component (D) in the resin composition according to the present invention is preferably 0.01% to 20% by weight.

By the use of the resin composition according to the present invention, a variety of molded articles can be produced. Specifically, molded articles may be any of, for example, injection-molded articles, extrusion-molded articles, compression-molded articles, blow-molded articles, sheets, films, threads, or fabrics. More specific examples include automobile parts, such as bumper fascias, radiator grilles, side moldings, garnishes, wheel covers, aero parts, instrument panels, door trims, seat fabrics, door handles, and floor mats, housings for home electric appliances, films for packaging products, waterproof sheets, various containers, and bottles. When the produced molded articles are used in the form of sheets, the molded articles may be laminated with paper or other polymer sheets and used in the form of multi-layer laminates.

Molded articles can be produced in accordance with conventional techniques without particular limitation. For example, a molded article can be produced by melting the resin composition according to the present invention and then processing into a form of interest. In this case, desired properties can be imparted to the molded articles by adding additives. As additives, for example, fillers, plasticizers, pigments, stabilizers, antistatic agents, ultraviolet absorbers, antioxidants, flame retardants, mold releasing agents, lubricants, dyes, antimicrobial agents, or end sealants may further be added. The content of such additives is preferably 100 parts by weight or less, and more preferably 50 parts by weight or less, relative to 100 parts by weight of the resin composition according to the present invention.

The temperature at which the resin composition according to the present invention can be adjusted to, for example, 180° C. to 300° C. When the temperature is lower than the lower limit, the resin composition may not be sufficiently melted, and the components may not be uniformly dispersed. In contrast, the molecular weight of the aliphatic polyester-based polymer (B) may be lowered and properties of the resulting molded article may become deteriorated when the temperature is higher than the upper limit.

Moreover, methods of processing the molded article of the resin composition according to the present invention into a form of interest are not particularly limited, and any of injection molding, extrusion molding, blow molding, inflation molding, profile extrusion molding, injection blow molding, vacuum-pressure molding, or spinning can be preferably employed.

EXAMPLES

Hereafter, the present invention is described in greater detail with reference to the examples, but the technical scope of the present invention is not limited to the examples.

Example 1

In this example, a propylene-ethylene block copolymer containing 12% by weight of a propylene-ethylene random copolymer having an MFR of 50 g/10 minutes (i.e., NOBLEN WPX5343, manufactured by Sumitomo Chemical Co., Ltd.) was prepared as the polyolefin-based polymer (A). In addition, a polylactic acid having an MFR of 15 g/10 minutes (i.e., Terramac TE2000C, manufactured by Unitika Ltd.) was prepared as the aliphatic polyester-based polymer (B). Further, an ethylene-1-octene copolymer having an MFR of 1.2 g/10 minutes (i.e., Engage EG8842, manufactured by Dow Chemical Japan Ltd.) was prepared as the elastomer (C). As the epoxy group-containing polyolefin-based polymer (D), an ethylene-glycidyl methacrylate copolymer having an MFR of 3 g/10 minutes (i.e., Bondfast E, manufactured by Sumitomo Chemical Co., Ltd.) was prepared.

The MFR at 190° C. of the elastomer (C) prepared in this example was measured to be 1.2 g/10 minutes. The MFR was measured using a Melt Indexer L207 (manufactured by Takara Industry Co., Ltd.) under a load of 21N. The density of the elastomer (C) prepared in the example was measured to be 0.862 g/cm$^3$. The density was a value measured by using a DENSIMETER H (manufactured by Toyo Seiki Seisaku-Sho, Ltd.) in accordance with JIS K 7112, "the method for measuring plastic density and specific gravity" for a 1-mm-thick sheet obtained by press molding at 150° C.

In this example, components (A) to (D) prepared in the above-described manner were introduced into a single screw injection molding machine at prescribed proportions to prepare test pieces. Molding conditions were adjusted to a cylinder temperature of 200° C. and a mold temperature of 30° C. The tensile test piece was molded into the form of an ASTM-1 dumbbell, the size of the flexural test piece was 127×12.7×3.2 (mm), and the size of the Izod test piece was 64×12.7×3.2 (mm), which was a half of the longitudinal length of the flexural test piece.

By the use of the resulting test pieces, a test of tensile elongation at break, a flexural modulus test, and an Izod test were carried out in the following manner. The tensile and fracture elongation test was carried out using an automated tensile testing machine (ATM-P, Orientech Co., Ltd.) at a test rate of 20 mm/min. The flexural modulus test was carried out using RTM-100 (Orientech Co., Ltd.) at a test rate of 2 mm/min. The Izod test was carried out using an Izod impact testing machine (Toyo Seiki Seisaku-Sho, Ltd.) at −30° C. after V-notching the test piece.

Example 2

In Example 2, test pieces were prepared in the same manner as in Example 1, except for the use of an elastomer (C) which had an MFR at 190° C. of 0.5 g/10 minutes. The test of tensile elongation at break, the flexural modulus test, and the Izod test were carried out in the same manner as in Example 1. The elastomer (C) used in Example 2 was an ethylene-1-butene copolymer (Tafmer A0550, Mitsui Chemicals, Inc.).

Example 3

In Example 3, test pieces were prepared in the same manner as in Example 1, except for the use of an elastomer (C) which had an MFR at 190° C. of 3.0 g/10 minutes. The test of tensile elongation at break, the flexural modulus test, and the Izod test were carried out in the same manner as in Example 1. The elastomer (C) used in Example 3 was a mixture obtained via melt kneading of an ethylene-1-octene copolymer having an MFR of 1.2 g/10 minutes (Engage EG 8842, Dow Chemical Japan, Ltd.) with an ethylene-1-octene copolymer having an MFR of 4.9 g/10 minutes (Engage EG 8200, Dow Chemical Japan, Ltd.) at a proportion of 40:60 in a twin screw extruder set to 170° C. (TEM 50, Toshiba Machine Co., Ltd.).

Example 4

In Example 4, test pieces were prepared in the same manner as in Example 1, except for the use of an elastomer (C)

which had an MFR at 190° C. of 1.7 g/10 minutes and a density of 0.896 g/cm³. The test of tensile elongation at break, the flexural modulus test, and the Izod test were carried out in the same manner as in Example 1. The elastomer (C) used in Example 4 was an ethylene-1-octene copolymer (Engage EG 8440, Dow Chemical Japan, Ltd.).

Example 5

In Example 5, test pieces were prepared in the same manner as in Example 1, except that the elastomer (C) content was set at 0.5% by weight. The test of tensile elongation at break, the flexural modulus test, and the Izod test were carried out in the same manner as in Example 1.

Example 6

In Example 6, the test pieces were prepared in the same manner as in Example 1, except that the elastomer (C), the polyolefin-based polymer (A), the aliphatic polyester-based polymer (B), and the epoxy group-containing polyolefin-based polymer (D) contents were set at 45% by weight, 41% by weight, 10% by weight, and 4% by weight, respectively. The tensile and fracture elongation test, the flexural modulus test, and the Izod test were carried out in the same manner as in Example 1.

Comparative Example 1

In Comparative Example 1, the test pieces were prepared in the same manner as in Example 1, except for the use of an elastomer (C) which had an MFR at 190° C. of 16 g/10 minutes. The test of tensile elongation at break, the flexural modulus test, and the Izod test were carried out in the same manner as in Example 1. The elastomer (C) used in Comparative Example 1 was an ethylene-1-butene copolymer (Excellen CX5505, Sumitomo Chemical Co., Ltd.).

Comparative Example 2

In Comparative Example 2, test pieces were prepared in the same manner as in Example 1, except that no elastomer (C) was mixed in, and the content of the polyolefin-based polymer (A) was set at 63% by weight. The test of tensile elongation at break, the flexural modulus test, and the Izod test were carried out in the same manner as in Example 1.

Comparative Example 3

In Comparative Example 3, test pieces were prepared in the same manner as in Example 1, except for the use of an elastomer (C) which had an MFR at 190° C. of 0.3 g/10 minutes. The test of tensile elongation at break, the flexural modulus test, and the Izod test were carried out in the same manner as in Example 1. The elastomer (C) used in Comparative Example 3 was an ethylene-1-butene copolymer (Tafmer A0250, Mitsui Chemicals, Inc.).

Comparative Example 4

In Comparative Example 4, test pieces were prepared in the same manner as in Example 1, except for the use of an elastomer (C) which had an MFR at 190° C. of 5.3 g/10 minutes. The test of tensile elongation at break, the flexural modulus test, and the Izod test were carried out in the same manner as in Example 1. The elastomer (C) used in Comparative Example 4 was an ethylene-1-butene copolymer (Engage ENR 7447, Dow Chemical Japan, Ltd.).

RESULTS

The compositions of the test pieces prepared in Examples 1 to 6 and Comparative Examples 1 to 4, as well as the results of the tests, are summarized in Table 1.

TABLE 1

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Component (A) | 46 | 46 | 46 | 46 | 62.5 | 41 | 46 | 63 | 46 | 46 |
| Component (B) | 30 | 30 | 30 | 30 | 30 | 10 | 30 | 30 | 30 | 30 |
| Component (C)-1 | 17 | — | — | — | 0.5 | 45 | 17 | — | 17 | 17 |
| Component (C)-2 | — | 17 | — | — | — | — | — | — | — | — |
| Component (C)-3 | — | — | 17 | — | — | — | — | — | — | — |
| Component (C)-4 | — | — | — | 17 | — | — | — | — | — | — |
| Component (C)-5 | — | — | — | — | — | — | 17 | — | — | — |
| Component (C)-6 | — | — | — | — | — | — | — | — | 17 | — |
| Component (C)-7 | — | — | — | — | — | — | — | — | — | 17 |
| Component (D) | 7 | 7 | 7 | 7 | 7 | 4 | 7 | 7 | 7 | 7 |
| Tensile elongation at break (%) | 610 | 400 | 622 | 554 | 35 | 512 | 223 | 17 | 323 | 337 |
| Flexural modulus (Mpa) | 719 | 936 | 702 | 916 | 1329 | 323 | 641 | 1249 | 1040 | 640 |
| Izod −30° C. (KJ/m2) | 13.2 | 8.6 | 8.5 | 5.6 | 2.4 | NB | 6.9 | 2.2 | 4.9 | 9.5 |

As is apparent from Table 1, a resin composition comprising a polyolefin-based polymer (A), an aliphatic polyester-based polymer (B), and an epoxy group-containing polyolefin-based polymer (D) can achieve an excellent balance of impact resistance and rigidity as a result of inclusion of an elastomer (C) which has an MFR, measured at 190° C. under a load of 21N, of 0.5 to 3.0 g/10 minutes. Thus, it became clear that such a resin composition exhibited various excellent properties, such as processability.

It became clear that when the MFR measured at 190° C. under a load of 21N was lower than 0.5 g/10 minutes or higher than 3.0 g/10 minutes, the balance of impact resistance and rigidity, as well as tensile elongation at break, were insufficient.

All publications, patents, and patent applications cited herein are incorporated herein by reference in their entirety.

The invention claimed is:

1. A resin composition comprising a polyolefin-based polymer (A), an aliphatic polyester-based polymer (B), an elastomer (C) having a melt flow rate (MFR), measured at 190° C. under a load of 21N, of 0.5 to 3.0 g/10 minutes, and an epoxy group-containing polyolefin-based polymer (D), wherein elastomer (C) consists of an ethylene-1-octene copolymer.

2. The resin composition according to claim 1, wherein, when the total amount of the polyolefin-based polymer (A), the aliphatic polyester-based polymer (B), the elastomer (C), and the polyolefin-based polymer (D) is designated as 100% by weight, the content of (A) is 30 to 90% by weight, the content of (B) is 1 to 50% by weight, the content of (C) is 1 to 40% by weight, and the content of (D) is 0.01 to 20% by weight.

3. The resin composition according to claim 1, wherein the elastomer (C) has a density of 0.855 to 0.875 g/cm$^3$.

4. The resin composition according to claim 1, wherein the polyolefin-based polymer (A) is a crystalline polypropylene-based polymer.

5. The resin composition according to claim 1, wherein the polyolefin-based polymer (A) is a polyethylene-based polymer.

6. A molded article using the resin composition according to claim 1.

* * * * *